March 22, 1955  J. H. TAYLOR  2,704,496
TRACTOR ATTACHED PLOW

Filed Oct. 5, 1949  10 Sheets-Sheet 2

INVENTOR.
Joseph H. Taylor
BY
ATTORNEYS.

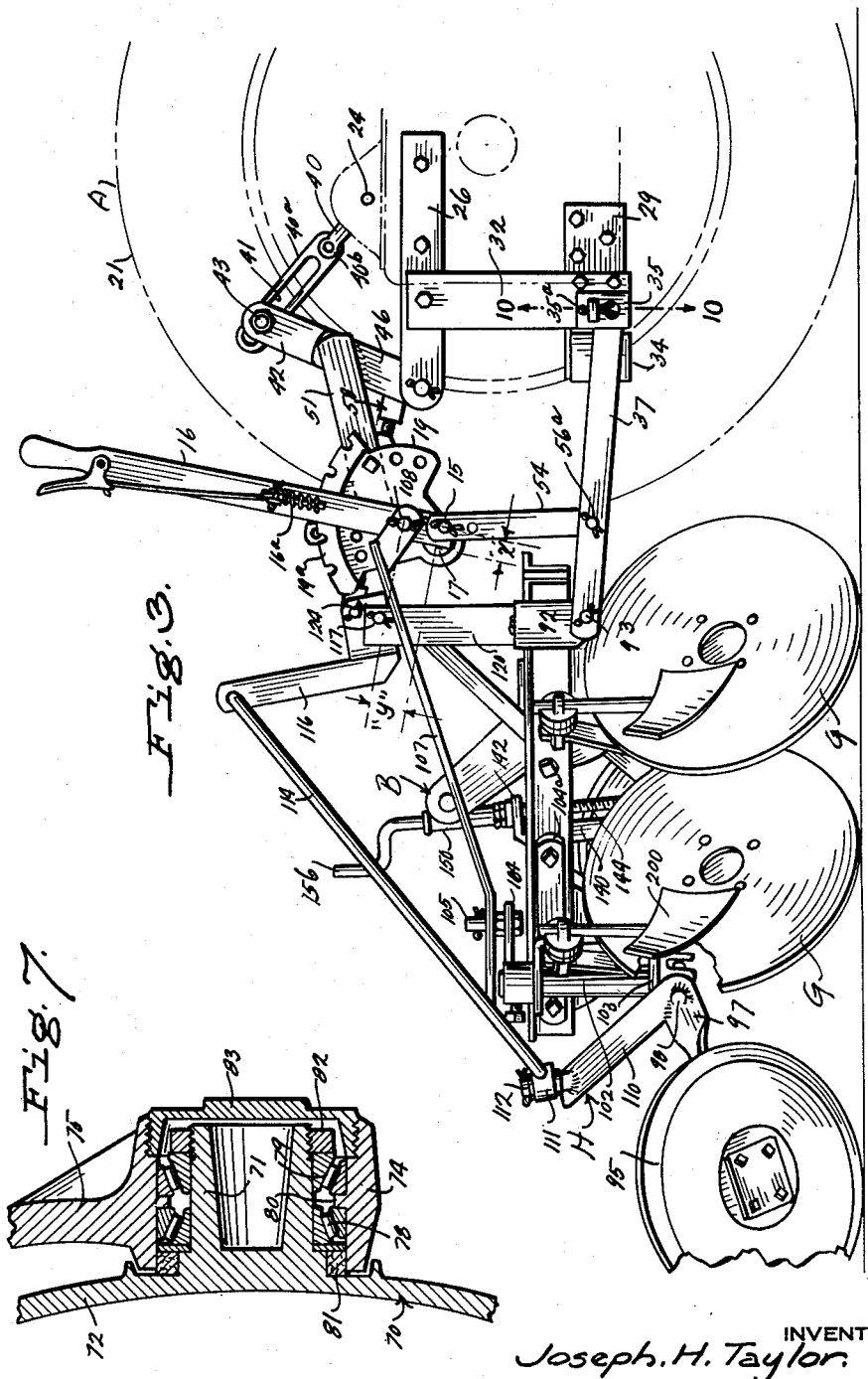

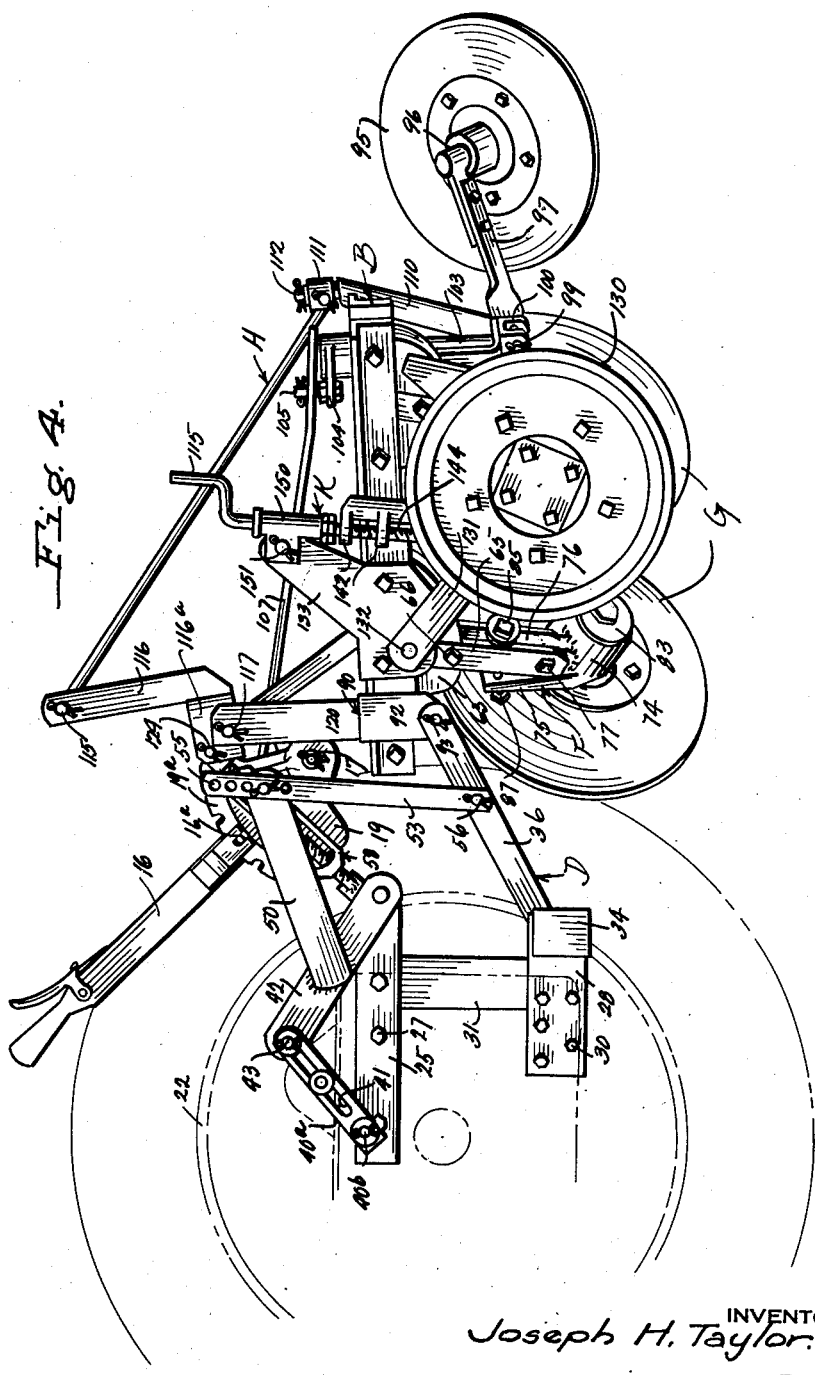

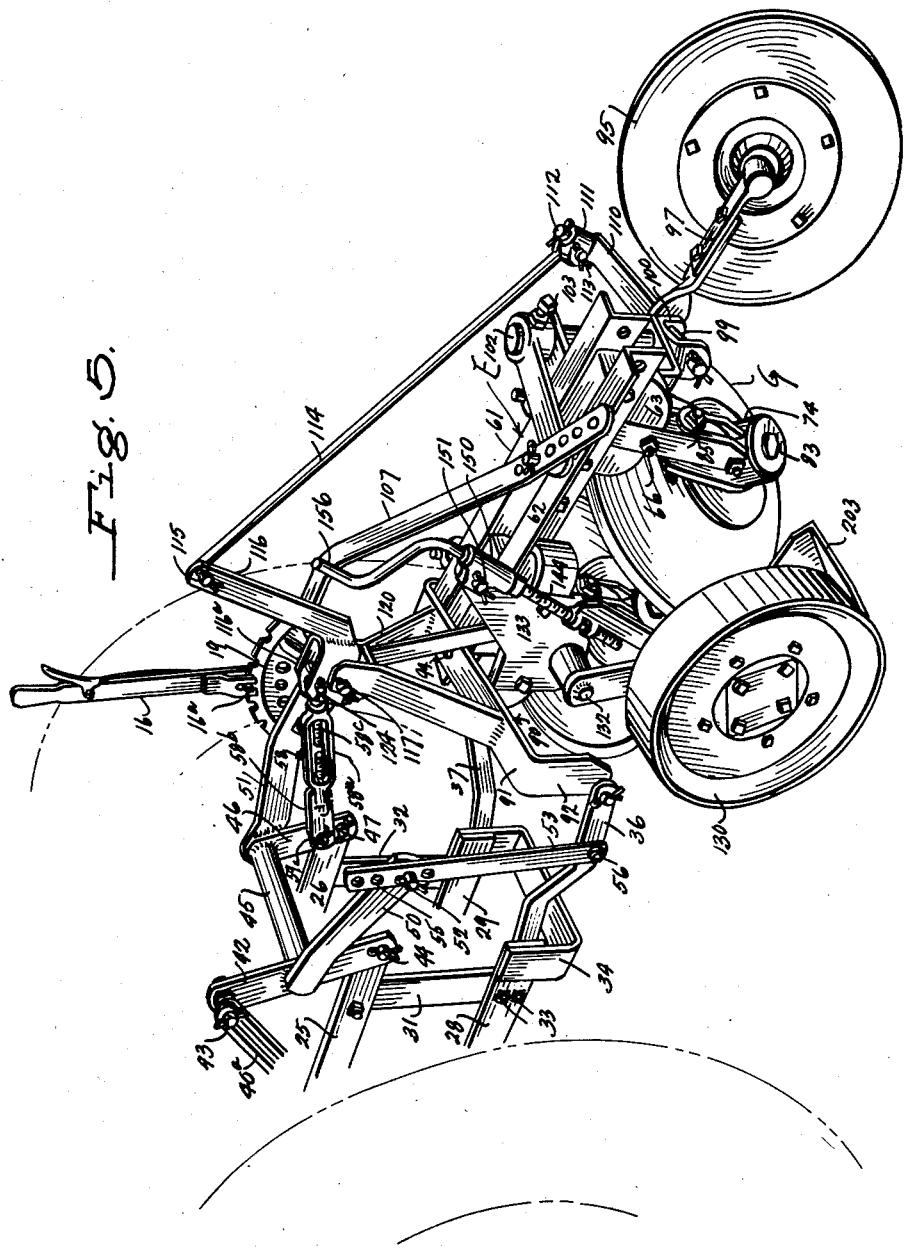

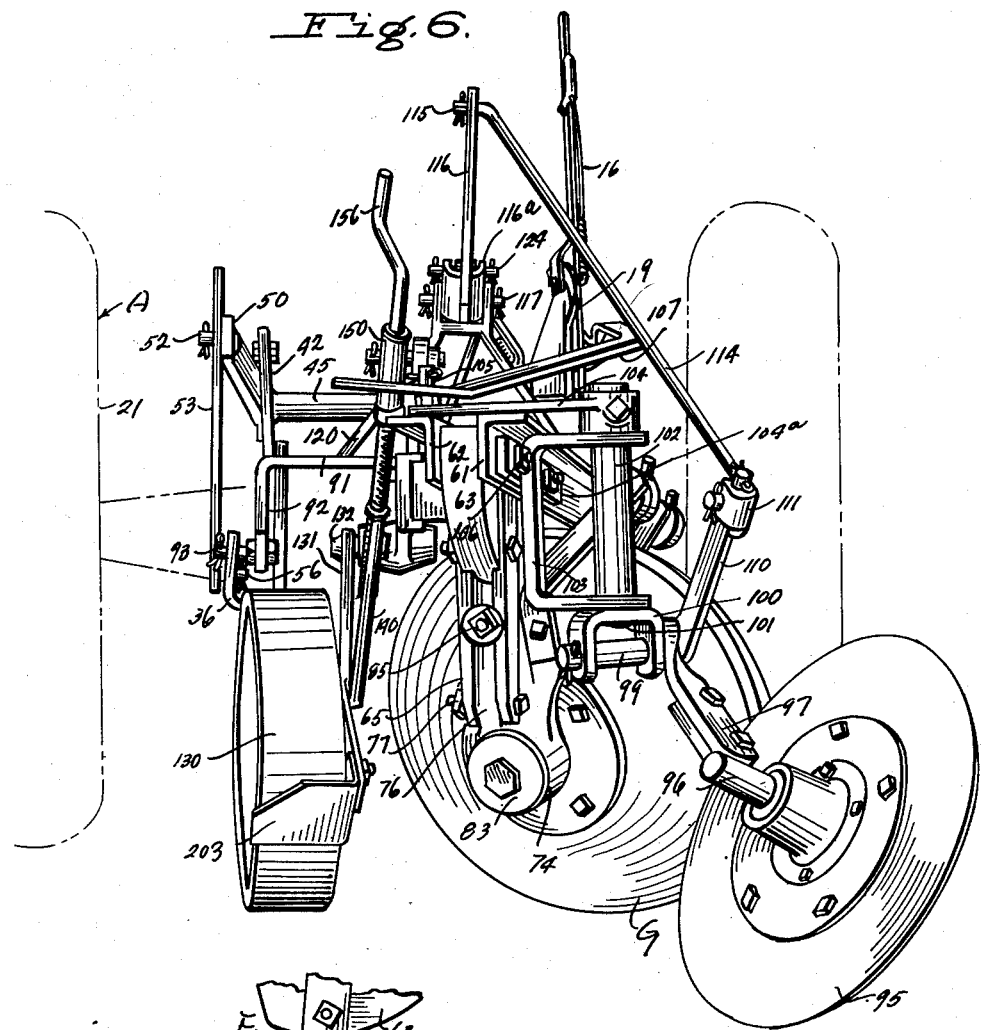

March 22, 1955

J. H. TAYLOR 2,704,496

TRACTOR ATTACHED PLOW

Filed Oct. 5, 1949

INVENTOR.
Joseph H. Taylor.
BY
ATTORNEYS.

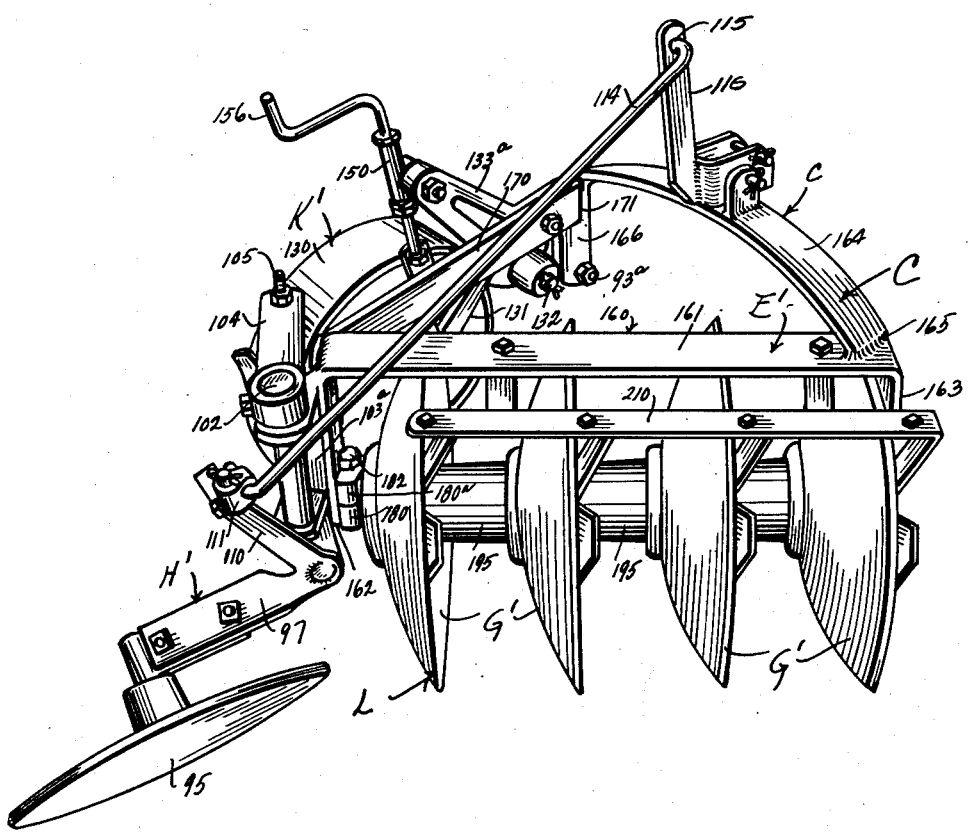

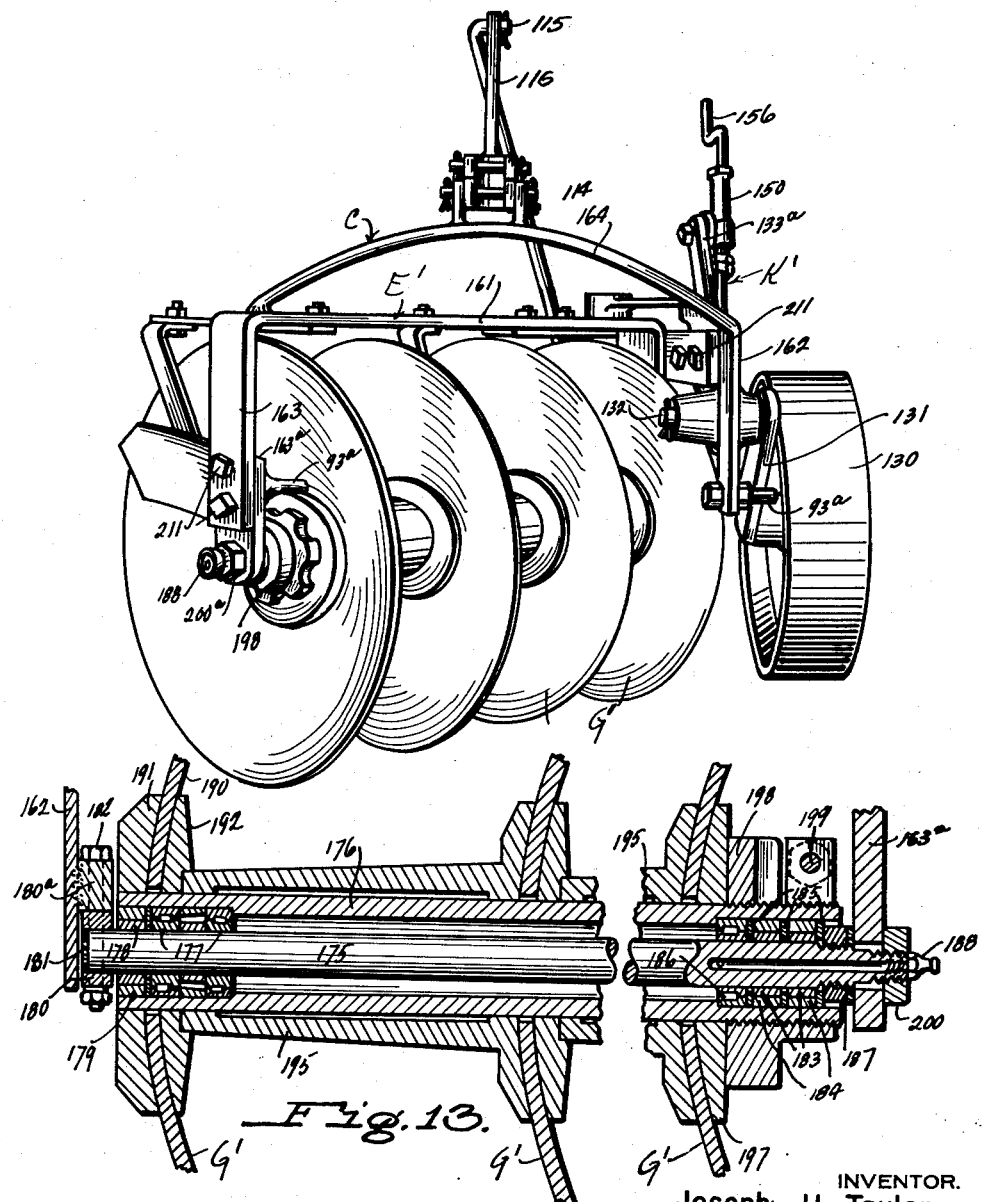

Inventor
Joseph H. Taylor

United States Patent Office 2,704,496
Patented Mar. 22, 1955

2,704,496

TRACTOR ATTACHED PLOW

Joseph H. Taylor, Athens, Tenn.

Application October 5, 1949, Serial No. 119,731

10 Claims. (Cl. 97—47.25)

This invention relates to improvements in agricultural implements.

The primary object of this invention is the provision of an improved plow construction adapted to be used in detachable assemblage with a motor operated tractor and having associated therewith improved implement lifting and lowering means.

A further object of this invention is the provision of an improved plowing implement adapted for close and efficient connection with respect to the tractor, so as to place as light draft as possible upon the tractor.

A further object of this invention is the provision of an improved plowing implement having means which will admit of quick and efficient attachment and detachment with respect to a tractor.

A further object of this invention is the provision of an improved plowing implement adapted to be used with conventional tractors, and to form when connected therewith a unitary compact combination which will enable facile control and handling of the implement with comfort to the driver.

A further object of this invention is the provision of an improved tractor type connected plowing implement having means to facilitate adjustment of the parts thereof to suit various plowing conditions.

A further object of this invention is the provision of an improved depth and stability control assemblage for agricultural implements.

A further object of this invention is the provision of an improved furrow wheel construction for plowing implements.

A further object of this invention is the provision of improved means for the mounting of plowing discs and parts upon a tractor.

A further object of this invention is the provision of an improved durable type of plow structure adapted for flexible connection to a power operated tractor in such manner that there will be little side draft; with the draft so developed that there will be a saving of tractor fuel and an increase in plowing speed.

A further object of this invention is the provision of means to automatically equalize the draft strain upon the tractor when the plow discs enter such soil as undesirably increases the draft, and at the same time automatically controls the furrow wheel, causing it to follow the contour of the furrow.

A further object of this invention is the provision of a manually controlled mechanism for lifting and lowering one side of the plow frame to compensate for plowing on sloping ground, and at the same time to automatically control the furrow wheel angle to suit the slope of the ground.

Other objects and advantages of the invention will be apparent during the course of the following detailed description, taken in connection with the accompanying drawings forming a part of this specification, and in which drawings:

Figure 3 is a right side elevation of the plowing implement attached to the tractor in plowing position.

Figure 4 is a left side elevation showing the plow in elevated relation upon the tractor.

Figure 5 is a perspective view showing the plowing implement.

Figure 6 is a rear elevation of the plowing implement.

Figure 7 is a cross sectional view showing the bearing of one of the plowing discs upon the frame structure of the plow.

Figure 8 is a perspective view showing the mounting of the disc supporting bearing upon the frame structure of the plow.

Figure 11 is a rear perspective view showing a tilling implement.

Figure 12 is another perspective view of the tilling implement.

Figure 13 is a fragmentary longitudinal cross sectional view taken thru the disc supporting structure of the tilling implement of Figures 11 and 12.

Figure 1:
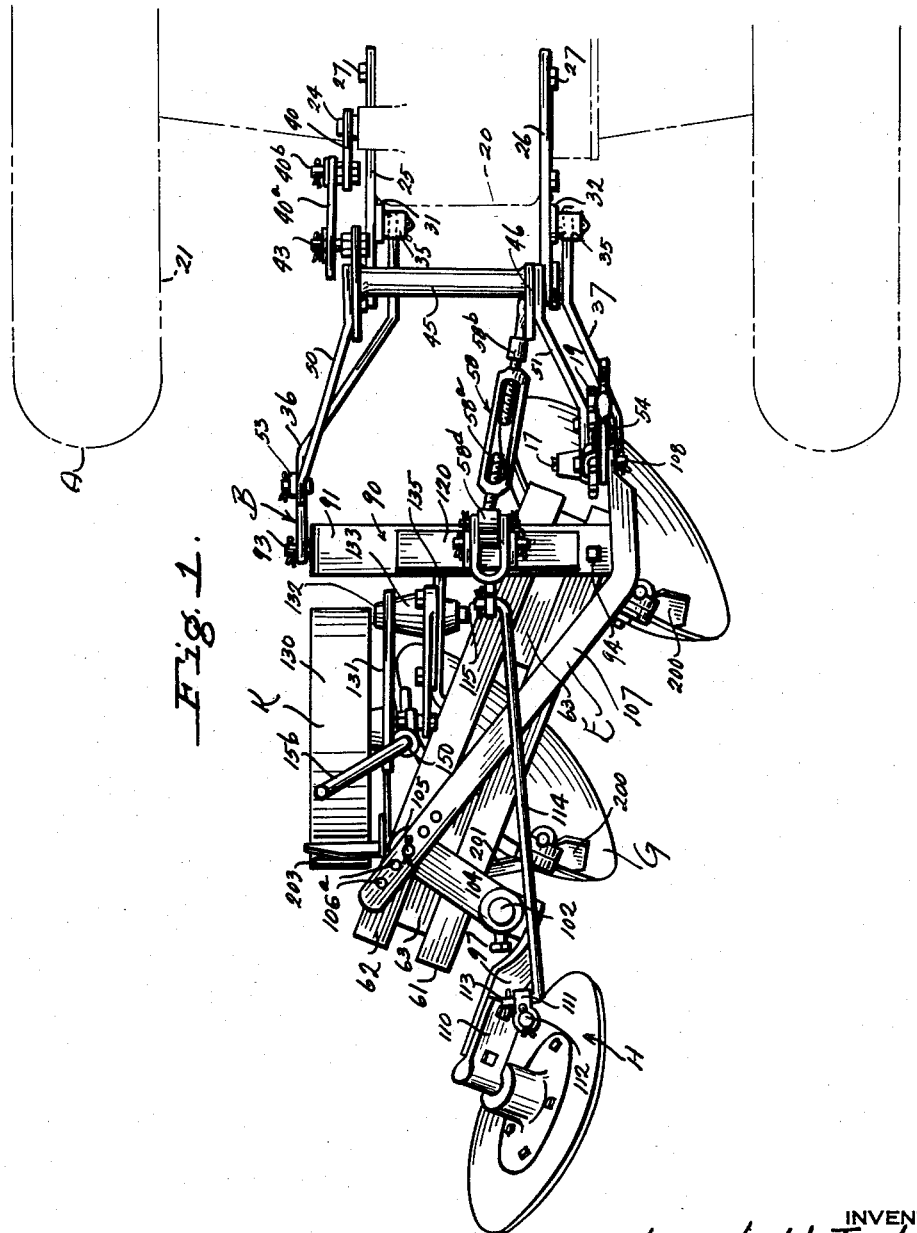
Figure 1 is a plan view showing the attachment of the plowing implement to a tractor (tractor being shown in dot and dash lines).

In the accompanying drawings, wherein for the purpose of illustration are shown several types of plowing and tilling implements, the letter A may generally designate a tractor with which the plow implement B and tilling implement C may be detachably associated and connected thereto by an improved hitch and lifting structure D.

The implement B shown in Figures 1 to 10 inclusive of the drawing, comprises a frame structure E; individual mounting frames F for the plowing discs G; a furrow wheel structure H and improved weighted land wheel structure K.

The implement C includes a frame structure E' having characteristics similar to the frame E. The implement C includes a gang disc-type assemblage L. The implement C furthermore has a furrow wheel structure H' and a weighted land wheel assemblage K'.

The hitch and lifting mechanism D is adapted for use with either the implements B or C. Furthermore, like reference characters are applied to like parts in the frame structures E—E'; furrow wheel structures H—H', and weighted land wheel structures K and K' in both forms of inventions B and C.

The tractor A is shown in the drawings in dot and dash lines, and it includes a frame structure 20 which houses a power unit (not shown) for the driving of the tractor wheels 21 and 22. The frame structure 20 includes a rear frame or casing portion 23 which houses a power lift mechanism (not shown) including a rotary lift shaft 24.

Referring to the hitch and lifting assemblage D, the same includes a pair of upper tractor frame connecting bars 25 and 26, bolted in fixed relation at 27 to opposite sides of the tractor frame portion 23. They extend slightly rearwardly therefrom. Furthermore, there are provided a pair of lower bar extensions 28 and 29 bolted at 30 to opposite sides of the tractor frame portion 23, and spaced below the bars 25 and 26. The latter are above the axle structure of the rear wheel assemblage of the tractor and the bars 28 and 29 are below. Vertically disposed frame pieces 31 and 32 are bolted at 33 to the fore portions of the frame bars 25, 26, 28 and 29. A U-shaped cross bar 34 is welded or otherwise connected to forward ends of the lower bars 28 and 29.

Drawbar links 36 and 37 are each pivotally and swivelly connected by a pin 38 to the extreme lower ends of the tractor frame bars 31 and 32. They extend rearward in divergent relation for connection to the plowing implements B or C, as the case may be, in accordance with means to be hereinafter described.

Figure 10:
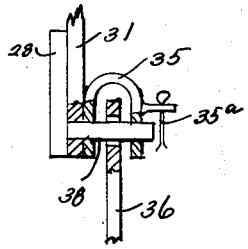
Figure 10 is an enlarged cross sectional view taken, substantially on the line 10—10 of Figure 3, thru one of the devices for connecting the drawbar links to the tractor frame.

The pin 38 is shown in Figure 10 as detachably supported by an inverted U-shaped bracket 35. The latter is welded to the frame bar 31 and supports both ends of the pin 38. A detachable cotter pin 35ᵃ acts as a stop to prevent accidental detachment of pin 38.

The hitch and lifting assemblage D includes a crank or lift arm 40 keyed upon the rotatable power lift shaft 24. It has a pivot connection 40ᵇ to connecting bar 40ᵃ which is slotted at 41. A lift rocker arm 42 at one end has a pivoted and sliding connection at 43 in the slot 41. The opposite end of the arm 42 is pivotally connected at 44 to the frame bar 25, as shown in Figure 5. Intermediate its ends the rocker arm 42 has welded thereto a shaft or member 45, in right angled relation therewith, which at its opposite end has an auxiliary rocker arm 46 pivotally connected at 47 to the rear end of the other frame bar 26, as shown in Figure 5. Welded and fixedly secured to the outer side of the rocker arms 42 and 46 at points in line with the connecting bar 45, are rocker extension arms 50 and 51. The rocker extension arm 50 extends rearward and has a pivoted-swivel type of connection at 52 with depending lifting link 53. The lift link 53 is provided with a series of openings 55 along the upper portion thereof for attachment of the swivel bolt 52 at varied distances with respect to the pivot connections 56 upon the bar 36, whereby to vary the degree of lift and depth plowing of the implement.

Figure 9:
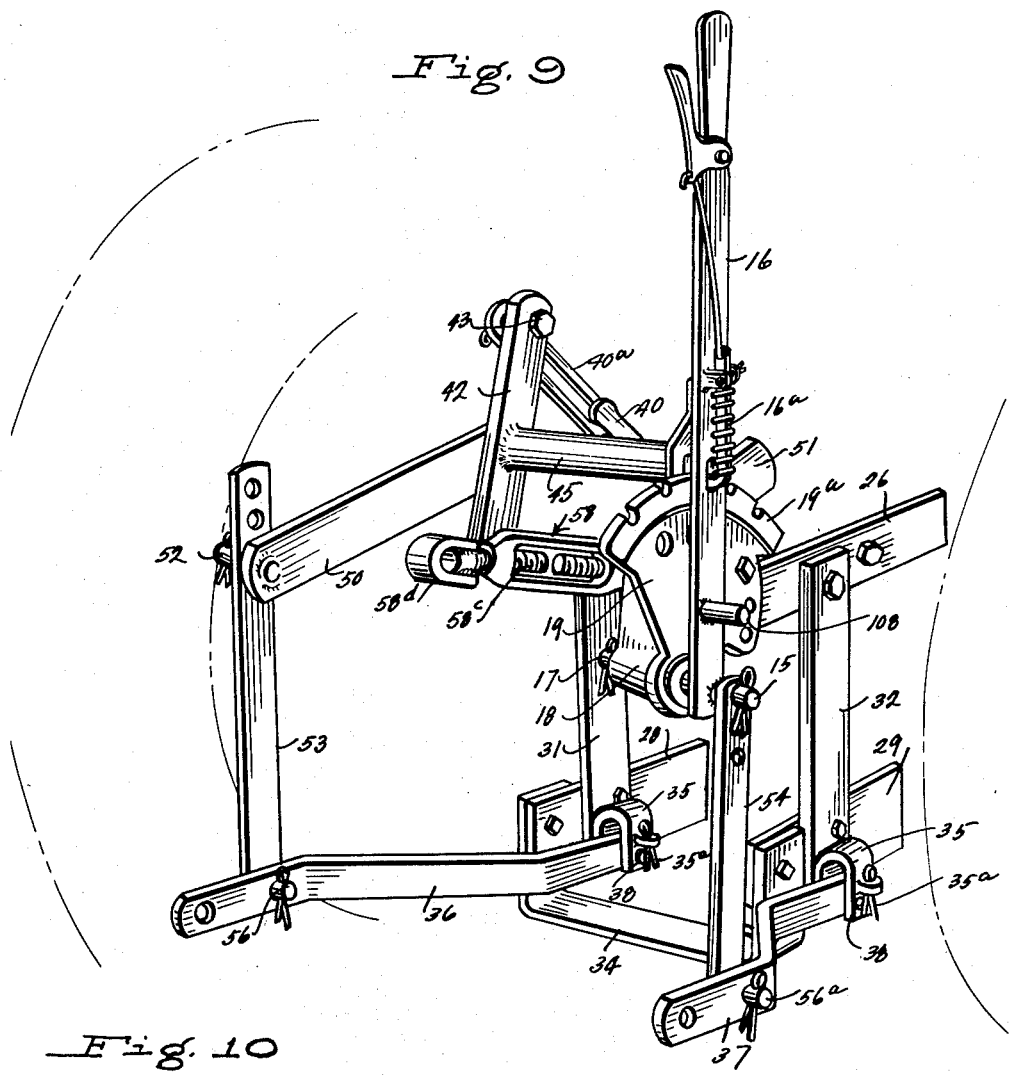
Figure 9 is a perspective view of the plow frame connecting linkage, attached to the tractor.

The other lift link 54, connected at 56ᵃ to the drawbar 37 has a series of openings at its upper end for selective connection to a crank pin 15 secured upon the lower end of a manually operated plow frame lifting and lowering lever 16, see Figures 3 and 9. The latter is pivoted by a pin 17, welded thereto in a flange extension 18 of a bracket 19 bolted to the rear end of the tractor fixed extension arm 51. The axes of the pins 15 and 17 are relatively offset for the distance "X" shown in Figure 3, and for the purpose to be subsequently described.

An extensible compression linkage 58; here shown as a turnbuckle, is pivotally connected at 59 to the rocker arm 46, as shown in Figure 5. This extensible linkage 58 is adapted for detachable connection with the furrow wheel assemblage in a manner to be subsequently described, for both forms of invention B and C. The extensible compression linkage 58 comprises a turnbuckle casing portion 58ᵃ having a bolt portion 58ᵇ adjustable therein, connected, as aforesaid, at 59. It also has an opposite bolt 58ᶜ provided with a strap loop 58ᵈ for pivoted connection upon a pin 124 of a plow disc adjusting linkage to be subsequently mentioned.

Figure 2:
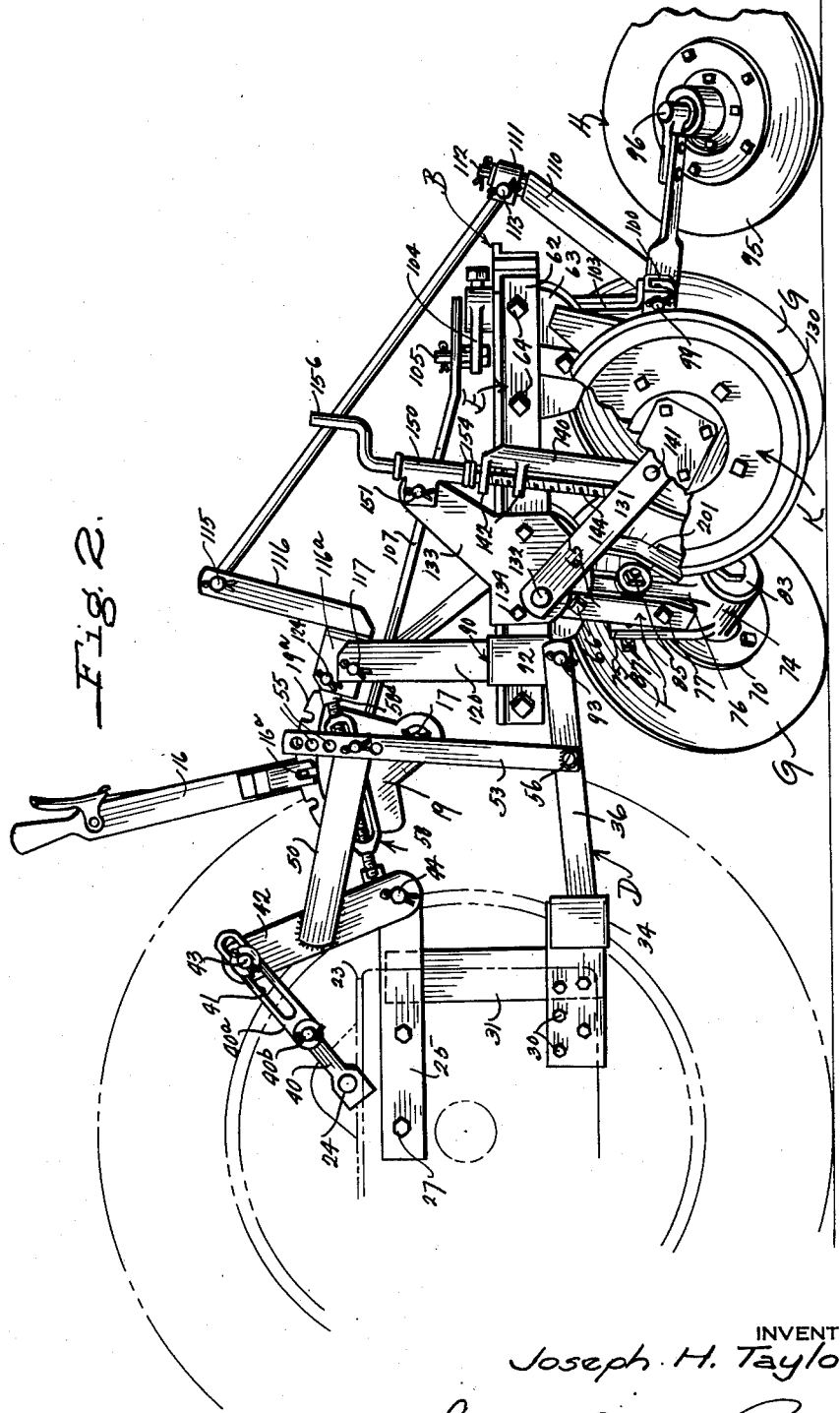
Figure 2 is a left side elevation of the plowing implement, attached to the tractor, in a lowered position.

Referring to the plowing implement B, the same includes a frame structure E for supporting the plowing discs C thru the mounting portions F. The frame structure E preferably comprises a pair of angle pieces 61 and 62, the depending leg portions of which are bolted in spaced relation to a plurality of solid block portions 63, as shown in Figures 1 and 5; cross bolts 64 being used to bolt these blocks in place, as shown in Figure 2. The blocks 63 depend below the legs of the frame flanges 61 and 62 and are side recessed for receiving spaced supporting legs 65 which are bolted to the blocks 63, by cross bolts 66.

It is within the contemplation of this invention that any number of these block and frame assemblages may be connected to the main frame structure of the implement to accommodate the desired number of plowing discs. Of course all parts are constructed of metal and they furnish a very stable weighted framework for support of the plowing discs and the bearings which are directly attached to the depending frame legs 65. It is a purpose of the invention to provide means for connecting the disc structure and its bearing structure to the depending legs 65 so the angle tilt of the disc may be varied, without destroying the stability and durability of connection of the disc and its bearing structure upon the frame members 65. To that end an improved disc holder 70 is provided, shown best in Figures 7 and 8, having a hub portion 71 and a slightly cupped flanged portion 72. The latter is provided with suitable openings to which conventional plowing discs G may be detachably bolted. An adjustable disc bearing housing 74 is provided, having an upwardly extending arm portion 75. The latter has a reduced laterally extending flange 76, pivoted at 77 upon and in the space between the respective bearing frame connector legs 65. The pivot connection 77 is close to the hub structure of the disc. Bearing housing 74 receives therein the hub structure 71. Oppositely sloping tapered roller bearing structures 78 and 79 are provided in the housing 74 for the rotatable support of the disc holder hub 71, as shown in Figure 7. The innermost roller bearing structure 78 includes inner and outer raceways and roller bearings, as shown, as does also the outer roller bearing structure 79; the two being separated by a flange 80 internally of the housing 74, as shown in Figure 7. A grease seal and washer assemblage 81 is provided to seal lubricant within the roller bearing compartment between the hub and housing above described, at the flanged side of the housing, and a bearing adjusting nut 82 is threaded upon the hub 71 for adjusting the bearing structure. A housing cap 83 is threaded upon the housing 74 for sealing the roller bearing compartment.

An adjustable and detachable bolt structure 85 adjustably connects the upper end of the bearing housing arm 75 to the supporting legs 65 of the plow frame structure, so that the vertical angle of the disc may be adjusted to suit plowing conditions. A set screw 87 threaded in the arm 75 engages against one of the frame supporting members 65, as shown in Figure 8, to hold the desired angle adjustment in a durable and efficient relationship.

At its forward end the frame structure E is provided with a hitch attaching frame member 90, including the main bar body 91 having legs 92 adapted for detachable connection at 93 with the rear ends of the draft bars 36 and 37. It is to be noted that the draft bars 36 and 37 relatively extend in rearward divergent relation as do the lift arm portions 50 and 51. The bolt connections 93 are loose and may be swiveled as are also the connections 38, so the implement may swing sideways during turning of the tractor. It is to be noted that the draft bar body 91 is rigidly bolted at 94 to the forward ends of each of the frame angles 61 and 62. The major portion of the draft bar body 91 extends laterally to the left side of the implement assemblage and at an acute angle with respect to the longitudinal axis of the frame angles, as is shown in Figure 1.

Figure 14:
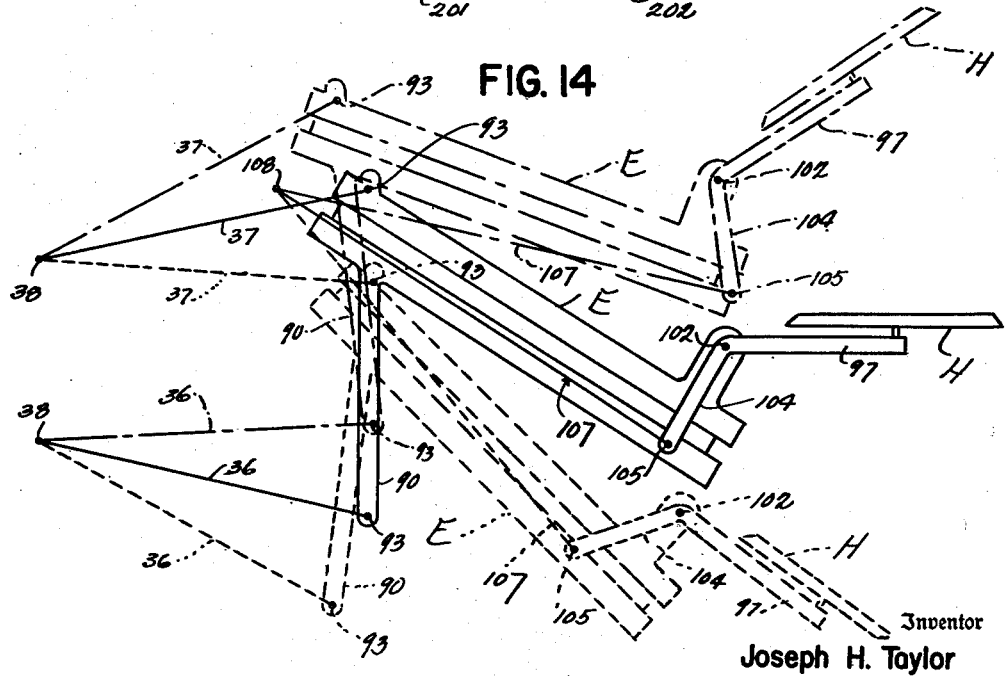
Figure 14 is a diagrammatic plan view, showing in full lines the position of the furrow wheel when the tractor is pulling the plow in a straight line; showing in dot and dash lines the position of the plow and furrow wheel when the tractor is making a right turn, and showing in dotted lines the position of the plow and furrow wheel when the tractor is making a left turn.

Referring to the furrow wheel assemblage and its associated structure, the direct mounting of the furrow wheel is best shown in Figures 5 and 6 of the drawings. The furrow wheel 95 may be of any approved type, rotatably mounted upon a pintle 96 extending laterally at the appropriate angle off horizontal upon the rear end of the furrow wheel supporting arm 97. The latter is welded, as shown at 98 (Figure 3) upon a pin 99 (Figure 6) pivoted upon an inverted U-shaped mounting piece 100. This connection is detachable, as shown in Figure 5. The piece 100 is welded at 101 to the lower end of a shaft 102; the latter being pivotally supported at its upper and lower ends in a bracket structure 103. This construction provides a crank action to enable lateral swing of the wheel 95. The bracket 103 has a welded rear extension 104ᵃ; as shown in Figure 6, which is detachably bolted at 106 to the plow frame angle 61. The bracket 103 may assume various shapes but it is fixedly connected in non-movable relation upon the frame angle, as shown, and is adapted to rotatably support the shaft 102 in order that the lateral draft angle of the furrow wheel may be changed according to directional movement of the tractor in a manner to be subsequently described. The upper end of the vertically disposed shaft 102 is provided with a laterally extending crank arm 104; the latter being provided with a collar and set screw construction which will admit of its detachable but rigid attachment upon the shaft 102, as shown. The arm 104 extends laterally over the frame angles and has a movable pivot connection at 105 in any of a series of openings 106ᵃ upon the rear end of a draft bar 107. Draft bar 107 extends forwardly at an angle to the longitudinal axis of the tractor and has a loose pivoted connection to a pin 108 mounted upon its manual regulating lever 16, as shown in Figure 3. The pin 108 is welded to the lever 16, and is offset with respect to the lever pivot pin 17, the distance "Y," for purposes to be subsequently described. This construction is very sturdy and durable and establishes a rear draft connection for the implement, in addition to the front draft connection above described. Likewise, upon directional turning change of the tractor, thru the draft bar connection 107, the lateral angle of the furrow wheel 95 will be changed to assist in turning and the following of the furrow wheel properly in the furrow. Figure 14 diagrammatically illustrates how this is accomplished. In this view the same numerals are used for like parts above described. The pivots 38 are fixed upon the tractor A, as is also the pin 108, shown in Figure 9, as part of the lever 16. So long as lever 16 is held by its ratchet in fixed position upon the tractor frame, the pin 108 is rigid and fixed with respect to the tractor frame and always moves therewith. The full lines in Figure 14 indicate the position of the parts of the tractor pulling in a straight line with the plow following thereafter. As the tractor makes a right turn the links 36 and 37 will assume the relative positions indicated by the dot and dash lines, as will also the plow frame and the furrow wheel, shown in dot and dash lines. It is quite obvious that under such circumstances the connecting rod 107 will move the furrow wheel H to the dot and dash position shown. Similarly, when the tractor makes a lefthand turn the relation of the parts will be that shown in dotted lines in Figure 14, with respect to the parts shown in the full and dot and dash line positions.

Inasmuch as the mounting of the furrow wheel is such that it will follow in the furrow, that is, drop into the furrow when plowing begins, thru the pintle connection 99, a lifting construction is provided for attachment to the compression linkage 58, above described. A lever arm 110 is welded to the pivoted end of lever 97, as shown in Figures 3 and 5 of the drawings; these two levers forming a bell crank type lever. The arm portion 110 at its upper end has a master control swivel block 111, pivoted on a pintle 112. The block furthermore is provided with a pivot connection 113 for the rear end of a connecting rod 114. The latter at its fore end is pivoted at 115 to the upper end of a master control arm 116. The latter has a U-shaped yoke 116ᵃ in crank providing offset relation at the lower end thereof, pivoted at 117 between the bifurcated ends of the superstructure 120 integrally connected with the bar portion 91 above described. The U-shaped yoke 116ᵃ has a detachable pin 124 mounted thereon in axially spaced relation with respect to the pin 117 and above and slightly to the rear under normal plowing conditions. It pivotally connects the rear end of the turnbuckle compression linkage 58 to the master control arm 116.

As to the operation of the lift linkage, upon forward movement of the power unit crank arm 40 the rocker arm construction comprising the portions 40ᵃ, 42, 45, 50 and 46 will rock from the position shown in Figure 2 to the position shown in Figure 4, and thru the link connections 53 and 54 with the draft links 36 and 37 the plowing implement will be lifted. Thru the turnbuckle linkage 58 the arm 116 will be rocked from the position shown in Figure 2 to the position shown in Figure 4 upon the pivot 117 and swing the bell crank lever, upon which the furrow wheel is mounted, upon the axis of its pintle 99 in order to lift the same off the ground.

The weighted land wheel assemblage K maintains the plow discs and furrow wheel in proper plowing relation with respect to the soil; gives added weight to the structure, and aids in controlling the plowing depth. It is intended to ride upon the unplowed side of the land and is adjustable vertically to that end. It comprises a heavy weighted wheel 130 having a rotatable spindle connection upon the lower rear end of a liftable bracket arm 131. The latter is pivotally secured at 132 upon a detachable bracket structure 133. The latter is secured at 134 upon a welded brace and bracket rail 135, which at its forward end is welded to the under side of the frame bar 91 and at its rear end is secured to the angle 62, either by bolting or welding. The weighted land wheel 130 lies in a plane parallel with the longitudinal axis of the tractor or implement.

The means for raising and lowering the land wheel 130 to properly locate the same upon the unplowed surface of the soil comprises an arm 140 pivoted at 141 upon the wheel supporting arm 131 close to the pintle connection of the wheel upon said arm 131. The upper end of the arm 140 is provided with lateral extensions 142 which are socket threaded to receive a threaded adjusting screw 144. The latter rotatably extends thru a supporting sleeve 150, pivoted at 151 upon the bracket 133.

Nuts 154 upon the threaded shank 144 prevent the screw 144 from lifting out of the sleeve 150 and to permit rotation therein. The upper end of the screw 144 is provided with a crank arm 156. It is quite apparent that rotation of the crank 156 will lift or lower the land wheel supporting arm 131 in order to adjust the position of the land wheel for depth control, etc.

Referring again to the manual means (the lever 16, etc.) for lifting and lowering the plow, the same is intended to manually take care of plowing depth when the plow is traveling along sloping ground. If the land is high on the righthand side of the implement, and throwing dirt uphill, it is difficult for plow discs to go deep enough. On the other hand, when plowing with the right hand side of the implement on the downhill side of the slope, the plow discs normally plow too deep. To compensate for this it will be noted that the lever 16 is provided with a pawl or detent 16ᵃ operating over a ratchet segment 19ᵃ provided as part of the bracket structure 19. Assuming that the plowing is being done with the righthand side of the implement facing uphill, to attain proper plowing depth for the disc the lever 16 is shifted forward by the operator. Due to the crank effect provided by the relatively offset pins 15 and 17 (the distance X), as shown in Figure 3, such action will lower the link 54 and thru its connection with the drawbar 37 the righthand side of the plow frame will be pushed down for deeper plowing. At the same time, due to the offset crank connection of the pins 108 and 17, the lever 107 will be shifted to throw the rear of the furrow wheel to the downhill side and this pulls the plow uphill and maintains the proper cutting width of the furrow. This control is only placed upon the one side of the implement, since just the reverse operation takes place when the righthand side of the tractor is plowing upon the downhill side. That is, the lever 16 is shoved rearwardly to lift the linkage at the righthand side of the plow frame and to throw the furrow wheel in the opposite direction. This dual function of controlling the plowing depth and the furrow wheel is due to the eccentric location of the pins 15 and 108 upon the pivoted operating lever.

The provision of the compression linkage 58 and its association with the master control lever 116 and the frame of the implement is important. During plowing, the draft has a tendency to swing the plow frame at the front thereof slightly downward so that the frame extension 120 will move thru an arc forwardly at its upper end. This action has a tendency to shove the compression linkage 58 forwardly, or in other words, to place it under additional compression. Bearing in mind that the links 36 and 37 are under tension during such circumstance, the compression linkage connection with the lever 116 will cause the latter to turn on its pivot 117. Due to the offset pivots 117 and 124, the crank-like master control lever 116 will be moved at its upper end slightly rearwardly. This action thru the connecting rod 114 will push the furrow wheel 95 more firmly against the ground wall of the furrow being plowed by the rear plow disc, causing the furrow wheel to follow accurately the contour of this furrow. All of this provides a very delicate balance of the entire plow by means of which the right amount of pressure and plowing depth is attained.

Figure 15:
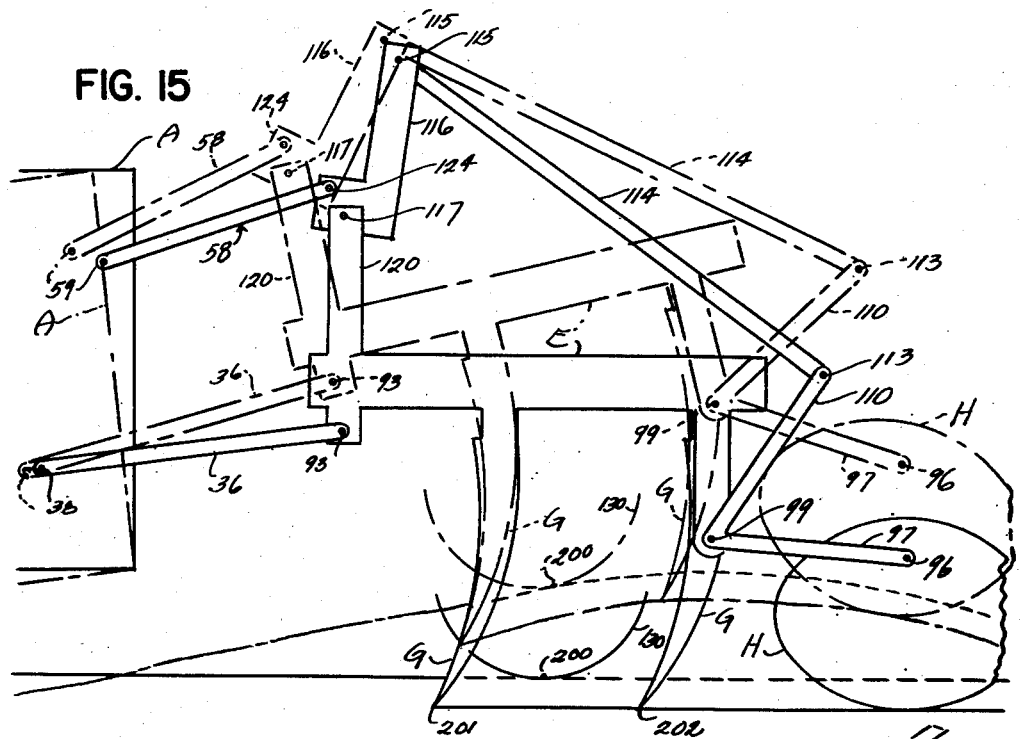
Figure 15 is a diagrammatic side elevation showing in full lines the relative positions of the tractor draft linkage, plow frame, discs, furrow wheel and land wheel when the tractor and plow are traveling over substantially level ground, and in dot and dash lines showing the changed relative positions of all of said elements when the travel is over convexly contoured or hilly ground.

Figure 15 is entirely diagrammatic, and serves the purpose of illustrating the action of the master control leverage for maintaining the furrow wheel in proper and efficient pressure contact with the wall of the furrow at all times. It also shows the cooperative action of the land wheel 130 with respect to the earthworking discs for controlling plowing depth. The same reference characters have been used in this diagrammatic view as have been applied to similar parts shown in other views. It will be noted from Figures 1, 2 and 4 that the ground contact point of the land wheel 130 lies at a location between the earthworking points or margins of the plowing discs G. This point of land contact of the land wheel 130 has been designated at 200 in Figure 15. It lies somewhere between the lowermost earth engaging points 201 and 202 of the two plowing discs G. Due to this arrangement there will be a tendency, due to draft resistance when plowing, to fulcrum the plow frame at the land wheel contact point 200. Thus a cooperative action results between the land wheel and the plowing discs.

It is well known in the art that with conventional plows employing a spring urged furrow wheel in combination with multiple disc plows, when the rear plow drops as in plowing soft soil, the spring tension upon the furrow wheel increases and tends to force the furrow wheel further down. The added tension has the effect of elevating the rear plow whereas just the opposite action is what is wanted. On the other hand, if the rear plow rises, as when encountering hard soil, the tension of the furrow wheel spring relaxes and does not urge the furrow wheel with the required effort into contact with the furrow wall.

Referring further to Figure 15, with the use of the plow of this application, during plowing in soft soil, the plow travels with the lower links 36 and 37 under normal tension, and the upper links including the compression linkage 58 under normal compression, as shown in the full line position of the parts in Figure 15. If hard soil is encountered, increasing the draft, the tension of the lower links 36 and 37 increases, and the compression upon the upper linkage, including the turnbuckle 58 increases. Due to such variation the lever 116 will fulcrum at its pivot point 117, as above described, causing the linkage 114 to move rearwardly and force the furrow wheel into the required firm contact with the side wall of the furrow. Likewise, when plowing over hilly land, it will be apparent that the parts will cooperate between the full line and the dot and dash line position shown in Figure 15, for the purpose of keeping the furrow wheel at all times in firm contact with the furrow wall, with the right amount of pressure, and thus aid in maintaining plowing or earthworking elements in proper depth regulation and position. This crank-like action of the lever 116 takes place with constant variation during plowing.

The plow can be used without the weighted land wheel, since the furrow wheel regulating linkage of the master control gear will operate as above described, but not upon the fulcrum point of contact 200 in the absence of the land wheel.

Referring to the plowing or tilling implement C shown in Figures 11, 12 and 13 of the drawings, the same is of the gang plow disc type wherein the plowing discs are rotatably supported upon the same axis and upon a common shaft.

The implement C preferably comprises an inverted U-shaped main frame 160 comprising a main rail portion 161 with depending legs 162 and 163 adapted to support the shaft upon which the plow discs G' are rotatably mounted, as will be hereinafter more full described. To the front end of the main frame 160 is secured a draft connecting frame rail 164 in acute angled relation with respect to the line of the main frame 160; one end being welded thereto at 165 and the opposite end having a depending arm 166. Upon the depending leg portion 162 of the main frame is mounted the furrow wheel assemblage; the bracket structure 103ᵃ thereof conforming to the bracket structure 103 in the form of invention B and the same being welded to the leg portion 162, as shown in Figure 11. Like reference characters have otherwise been applied to similar portions of the furrow wheel assemblage for the forms of inventions B and C.

The tiller C has a weighted land wheel assemblage K', which is mounted upon a bar portion 170 of the main frame assemblage. This frame bar portion 170 is welded at its end 171 to the depending leg 166 and at its opposite end is welded to the leg 162. It is upon the bar portion 170 that the bracket 133ᵃ of the land wheel lifting and lowering assemblage K' is mounted. Otherwise the weighted land wheel assemblage is the same as above described for the form of invention B, and similar reference characters designate like parts in both forms of invention.

Referring to the means for supporting the plowing discs G', dead axle 175 is provided, upon which a disc tube or cylinder 176 rotates. The cylinder 176 is supported upon its ends upon the dead axle 175 by tapered thrust bearings. One end is supported upon a double thrust bearing 177. This end is provided with a steel sleeve 178 having a ground fit on the dead end of the axle 175 and adapted to receive the bearing thrust. The sleeve 178 is encased in a conventional seal ring 179 having washers at the inner side thereof, as shown in Figure 13, to prevent lubricant leakage. The end of the dead axle 175 is provided with a block portion 180 which may be welded thereto at 181; this block 180 being bolted at 182 to the inner side of the main frame depending leg 162, as shown in Figure 13. The other end of the shaft 175 is provided with a pair of steel spacer rings or sleeves 183 having associated therewith conventional seal rings 184 and provided with intermediate and end washers 185, one of which abuts against a thrust bearing 186. The latter supports the cylinder 176 upon this end of the shaft 175. The bearing 186 is held in place upon the axles by means of a nut 187 which is threaded upon the axle and engages against one of the washers 185. The lubricant is supplied by means of a fitting 188 thru a passageway and duct in the shaft into the space between the axle and tube 176 for lubricating all bearings.

The plowing discs G' are assembled upon the axle tube 176 from the end shown at the right in Figure 13. The innermost disc abuts against a plate 191 which may be welded or secured upon the extreme end of the cylinder 176. Seating plates 192 are located at the concaved sides of the discs G' for receiving the smaller ends of tapered spacing sleeves 195; the latter at the opposite end being provided with flanged portions for receiving the adjacent discs in the assemblage shown in Figure 13. The disc G' is provided with a ring portion 197 against which a disc retaining nut 198 engages. The latter is threaded upon the externally threaded end of the cylinder 176 and has a hub portion which is bifurcated and clamped together by means of a bolt 199 in accordance with the principle shown in my application Serial Number 19,119, filed in the United States April 5, 1948, now Patent No. 2,686,395. The axle 175 is attached to the bracket arm extension piece 163ᵃ of the main supporting frame by means of a nut 200 threaded upon the axle, as shown in Figure 13. In the main, the gang disc type plow functions upon the shaft and cylinder structure above described in the same manner as in my above identified copending application.

Upon the type of plow B, scrapers 200 are preferably provided for the discs G. They are adjustably mounted upon brackets 201 attached to the bearing housing of the discs at the convex side of the discs, as shown at 202 in Figure 2 of the drawings. Likewise, a scraper 203 may be provided for the land wheel 130 which may be bolted to the wheel supporting arm 131.

In connection with the form of implement C, individual scrapers for the discs G' may be mounted upon a bracket bar 210, secured at 211 to the main frame 160, as shown in Figures 11 and 12 of the drawings.

The tiller C is attached to the tractor hitch D by connecting the draw bars 36 and 37 to the pivot pins 93ᵃ shown in Figure 12. The lift linkage 58 is connected to the lever 116 as for the form of plow B.

Various changes may be made to the forms of the invention herein shown and described without departing from the spirit of the invention or the scope of the claims.

I claim:

1. In combination with a tractor having a power operated lift shaft, an agricultural implement including a main frame, earth working means supported by the frame, means connecting the frame to the tractor so the frame will swing laterally as the tractor changes its directional course, means connected with the power operated shaft for lifting the implement frame upon said tractor, a furrow wheel, means mounting the furrow wheel upon the frame for lateral swinging to follow the furrow, means connecting the last mentioned means with the tractor to automatically change the lateral angle of the furrow wheel as the frame moves laterally due to directional change of the tractor, and means connecting the furrow wheel with the tractor to automatically swing the furrow wheel upwardly with respect to said frame and support it in such position when the main frame is lifted by the power operated lift shaft.

2. In an agricultural implement adapted to be drawn by a tractor the combination of a main frame, an earth engaging plow mounted upon the main frame, a furrow wheel, a bell crank lever having a pair of arms, one of said arms at its outer end having the furrow wheel rotatably mounted thereon on a transverse axis, a shaft rotatably mounted upon the main frame on an upright axis, means connected at the juncture of the arms of the bell crank lever rotatably supporting the bell crank lever upon an axis transverse to and connected to said shaft and at a location laterally of the axis of said shaft so that upon rotation of the shaft the bell crank lever will be bodily moved laterally, means for connecting the frame of the implement to a tractor, said shaft having a laterally extending crank arm, means for connecting said crank arm spaced from the axis of the shaft to the tractor drawing the implement for rotating said shaft as the tractor changes its direction of travel, means for bodily lifting and lowering the frame upon the tractor, and means connecting the second arm of the bell crank lever remote from the bell crank lever juncture of its arms to the tractor for automatically lifting the furrow wheels as the implement is lifted with respect to the tractor.

3. In combination with a tractor having a power lift and including a frame, a plowing implement including a frame and plowing means associated therewith, a furrow entering member mounted upon the frame at the rear thereof, means for laterally moving the furrow entering member, means for lifting and lowering the furrow entering member with respect to the plow frame, a hitch for connecting the plowing frame to the frame of the tractor, means embodied in said hitch to automatically control the ground pressure of the furrow member as the plow frame is tilted longitudinally due to increase or decrease of draft, said hitch having connection with the power lift whereby to entirely lift the implement, and means to laterally tilt the plowing means for varying the plowing depth selectively at either side of the tractor including a connection with the means to laterally move the furrow entering member whereby to vary the draft angle thereof.

4. A plowing implement adapted to be connected to a tractor having a power lift mechanism comprising an elongated frame structure having plowing means connected therewith, a furrow wheel, means mounting said wheel upon the frame for vertical lifting and lowering and lateral shifting, a lever mechanism pivotally connected upon said plow frame having a connection with the means mounting said wheel upon the frame for lifting and lowering the furrow wheel whereby upon movement of said lever the furrow wheel will be selectively lifted or lowered, lifting linkage connecting the lift mechanism and the frame, and means connected with said lever and eccentric to the pivot mounting of said lever having connection with said lifting linkage whereby upon the placement of varying draft upon the plow frame causing it to tilt, the plowing depth will be automatically controlled.

5. In an agricultural implement the combination with a power operated tractor, a plow frame, tension linkage pivotally connected to the fore end of the plow frame at the lower portion thereof and also pivotally connected to the tractor, an earthworking element mounted upon the frame of said plow, a furrow following member, lever means pivotally mounting the furrow following member upon said frame to the rear of said earthworking element for riding in the furrow thereof in contact with the furrow side wall, a lever pivotally mounted upon said plow frame at the front thereof and at a location above the pivotal connection of the tension linkage with the frame with its pivotal location above the lever mounting of the furrow following member upon said frame, compression linkage pivotally connected to said last mentioned lever with its pivot spaced from the pivot of the last mentioned lever upon said plow frame, said compression linkage having pivotal connection with the tractor at a location above the pivotal mounting of the tension linkage upon the tractor, and connecting means between the compression linkage connected lever and the lever means of said furrow wheel for elevating and lowering the furrow following member upon rocking movements of the compression linkage connected lever.

6. In an agricultural implement the combination with a power operated tractor, a plow frame, tension linkage pivotally connected to the fore end of the plow frame at the lower portion thereof and also pivotally connected to the tractor, an earthworking element mounted upon the frame of said plow, a furrow following member, lever means pivotally mounting the furrow following member upon said frame to the rear of said earthworking element for riding in the furrow thereof in contact with the furrow side wall, a lever pivotally mounted upon said plow frame at the front thereof and at a location above the pivotal connection of the tension linkage with the frame with its pivotal location above the lever mounting of the furrow following member upon said frame, compression linkage pivotally connected to said last mentioned lever with its pivot spaced from the pivot of the last mentioned lever upon said plow frame, said compression linkage having pivotal connection with the tractor at a location above the pivotal mounting of the tension linkage upon the tractor, connecting means between the compression linkage connected lever and the lever means of said furrow wheel for elevating and lowering the furrow following member upon rocking movements of the compression linkage connected lever, a land wheel, and means mounting the land wheel upon said frame for riding upon unplowed land.

7. In combination with a tractor, a plow frame, a plurality of earthworking elements mounted upon the frame in longitudinally spaced relation thereupon, a furrow wheel, lever means for said furrow wheel pivoted upon said frame for lifting and lowering the furrow wheel, tension linkage pivoted upon the tractor and pivoted to the plow frame, an operating lever pivotally mounted upon the front of the plow frame at a location above the pivotal connection of the tension linkage with the plow frame and above the pivoted connection of the furrow wheel lever with the plow frame, compression linkage pivotally connected with said operating lever at a location spaced from the pivotal connection of said operating lever with the plow frame, said compression linkage having pivotal connection with the tractor at a location above the pivotal connection of the tension linkage with the tractor, and connecting means pivotally connected to the compression linkage connected lever and to the lever means which connects the furrow wheel to the frame whereby rocking movement of the compression linkage connected lever will elevate and lower the furrow wheel.

8. In combination with a tractor having a rearwardly extending hitch mechanism (D) provided with means of connection to the tractor for vertical lift and lowering movements and for lateral swinging of the same relative to the tractor's longitudinal axis, an agricultural implement including a main elongated frame, a plowing member supported by the frame, means connecting the frame at its forward end to the rear portions of said hitch mechanism so that the frame will swing laterally as the tractor changes its directional course, a furrow wheel, means mounting the furrow wheel upon the frame rearwardly of said plowing member on a transverse axis (pin 99) for upright movement on the frame and also on an upright axis (shaft 102) for lateral and transverse movement relative to the frame, means (107) connecting the furrow wheel mounting means with the hitch mechanism for lateral movement of the furrow wheel on its upright axis (shaft 102) as an incident of directional change in movement of the tractor, means (elements 15, 16 and 54) for lifting one side of the hitch mechanism relative to the opposite side thereof, and means (elements 110, 114 and 116) connecting the furrow wheel mounting means with the hitch mechanism for elevating and lowering the furrow wheel upon its transverse pivot axis (99) upon tendency of the hitch to move vertically relative to the frame due to draft variation.

9. An agricultural instrument as set forth in claim 8 wherein a land riding wheel is provided at a location on the frame laterally of the plowing member and forwardly and laterally of the furrow wheel.

10. In an agricultural implement adapted to be drawn by tractor the combination of a main frame, an earth working element mounted upon the main frame, a furrow wheel, an upright shaft mounted upon said frame for rotation on an upright axis, a lever rotatably supporting the furrow wheel thereon having a pivotal connection with said upright shaft on a transverse axis for lifting and lowering movements of the furrow wheel on said transverse axis, said lever connection with the upright shaft effecting lateral swinging of the furrow wheel upon movement of said upright shaft upon its upright axis, a lateral arm connected with the upright shaft for rotating the upright shaft upon its upright axis, means for connecting the furrow wheel and its lever to a tractor drawing the implement for lifting and lowering the furrow wheel upon its transverse mounting axis, and means for connecting the arm of the upright shaft with a tractor for rotating the upright shaft upon lateral movement of the implement frame with respect to the tractor axis for the lateral shifting of the furrow wheel.

(References on following page)

References Cited in the file of this patent

UNITED STATES PATENTS

| Number | Name | Date |
|---|---|---|
| 1,196,222 | Esping | Aug. 29, 1916 |
| 1,390,578 | Nichols | Sept. 13, 1921 |
| 1,637,811 | Ferguson | Aug. 2, 1927 |
| 2,003,831 | Glaves | June 4, 1935 |
| 2,098,472 | Strandlund | Nov. 9, 1937 |
| 2,204,490 | Harris | June 11, 1940 |
| 2,217,900 | Graham | Oct. 15, 1940 |
| 2,309,750 | Carrington | Feb. 2, 1943 |
| 2,320,141 | Kott | May 25, 1943 |
| 2,320,624 | Love | June 1, 1943 |
| 2,322,342 | Bunn | June 22, 1943 |
| 2,330,302 | Morkoski | Sept. 28, 1943 |
| 2,356,231 | Ferguson | Aug. 22, 1944 |
| 2,372,459 | Todd | Mar. 27, 1945 |
| 2,386,378 | Wippel | Oct. 9, 1945 |
| 2,392,006 | Silver | Jan. 1, 1946 |
| 2,437,875 | Chambers et al. | Mar. 16, 1948 |
| 2,455,727 | Bunting | Dec. 7, 1948 |
| 2,456,465 | Strandlund | Dec. 14, 1948 |
| 2,518,972 | Allen | Aug. 15, 1950 |
| 2,577,002 | Corl, Jr. et al. | Dec. 4, 1951 |
| 2,608,145 | Knapp | Aug. 26, 1952 |
| 2,635,517 | Silver et al. | Apr. 21, 1953 |